United States Patent

Von Hippel et al.

Patent Number: 6,096,173

Date of Patent: Aug. 1, 2000

[54] METHOD OF PRODUCING HYDROGEN CYANIDE

[75] Inventors: Lukas Von Hippel, Alzenau; Andreas Gutsch, Ranstadt; Roland Schaffer, Lisengericht; Manfred Sauer, Rodenbach; Rudolf Vanheertum, Kahl, all of Germany

[73] Assignee: Degussa Aktiengesellschaft, Frankfurt, Germany

[21] Appl. No.: 09/206,361

[22] Filed: Dec. 7, 1998

[30] Foreign Application Priority Data

Dec. 11, 1997 [DE] Germany .................... 197 54 982

[51] Int. Cl.[7] .................................................. B01J 19/08
[52] U.S. Cl. ............................................ 204/164; 423/375
[58] Field of Search .............................. 204/164; 423/375

[56] References Cited

U.S. PATENT DOCUMENTS

| | | | |
|---|---|---|---|
| 2,858,261 | 10/1958 | Pevere et al. | 204/171 |
| 2,986,506 | 5/1961 | Friel et al. | 204/156 |
| 3,185,638 | 5/1965 | Cremer et al. | 204/312 |
| 3,205,162 | 9/1965 | MacLean | 204/312 |
| 3,674,668 | 7/1972 | Bjornson et al. | 204/171 |

FOREIGN PATENT DOCUMENTS

| | | |
|---|---|---|
| 0407809 | 5/1993 | European Pat. Off. |
| 1 095 798 | 12/1960 | Germany . |
| 1 132 897 | 7/1962 | Germany . |
| 1 144 238 | 2/1963 | Germany . |
| 144505 | 10/1980 | Germany . |
| 195 24 158 | 1/1997 | Germany . |
| 867227 | 5/1961 | United Kingdom . |

Primary Examiner—Kishor Mayekar
Attorney, Agent, or Firm—Smith, Gambrell & Russell, LLP; Beveridge, DeGrandi, Weilacher & Young Intellectual Property Group

[57] ABSTRACT

A method of producing hydrogen cyanide by the gas-phase reaction of methane with ammonia at elevated temperature and an ammonia/methane ratio of 1.001 to 1.1. The conducting of the gaseous reaction mixture through a corona discharge causes the reaction to start at temperatures below 1000° C. without the action of a catalyst. This results in considerable savings of the necessary investment expenses as well as of the running costs for energy.

6 Claims, 3 Drawing Sheets

METHOD OF PRODUCING HYDROGEN CYANIDE

INTRODUCTION AND BACKGROUND

The present invention relates to a method of producing hydrogen cyanide by the gas-phase reaction of methane with ammonia at elevated temperature and operating with an ammonia excess of at least 0.1 molar %.

Hydrogen cyanide is currently produced on an industrial scale according to the Andrussow method or by the BMA method (see Ullmann's Encyclopedia of Industrial Chemistry, volume A8, Weinheim 1987, pages 161–163). In the Andrussow method the reactants which are methane, ammonia and oxygen are reacted at temperatures above 1000° C. in the presence of a catalyst to form hydrogen cyanide and water. The catalyst is typically a wire mesh made of a platinum/rhodium alloy or platinum/iridium alloy. The reaction can be represented as:

$$2CH_4 + 2NH_3 + 3O_2 \rightarrow 2HCN + 6H_2O$$

In order to obtain an optimum yield, the prior knowledge has indicated that a very short contact time (milliseconds) is required and consequently a high operating temperature is required to reach equilibrium. Typical conversion efficiencies reported in the art are of the order of 60–70%.

A representative catalyst used in this commercially known process is 10% rhodium, 90% platinum using a wire diameter of 0.076mm. Until the introduction of knitted catalyst this was traditionally woven gauze at 1024 mesh/cm². As known in the art a 10% rhodium/platinum has been used as a typical alloy although other alternatives have also been tried.

In a typical installation depending on the reactor type and operating conditions, between 6 and 40 gauzes are installed. As is known, the catalyst can be supplied as a single pad or in pads of 3 or 4 gauzes.

According to observations in the industry, during operation the catalyst wires can expand by approximately 25% with the top gauzes becoming completely porous. The degree of porosity normally decreases with increasing thickness and at the bottom most gauzes still retain a solid core. However, during the process the gauzes may become sintered together making separation extremely difficult. As is the case in ammonia oxidation the surface of the wire develops a crystallite structure which significantly increases the available surface area.

As the majority of plants operate at atmospheric or low pressure, metal losses are minimal compared to ammonia oxidation. Typical losses are of the order of 3% of the installed weight per cycle.

Contamination of the gauze surface, particularly with iron, can have a very adverse effect on the efficiency of the reaction. Sulphur, silica and aluminum are also contaminants that will significantly reduce catalyst performance. Other common problems include gas distribution and obtaining an homogenous gas mixture. Frequent shutdowns can also cause the catalyst pack to shrink.

In the BMA method, methane and ammonia are reacted at temperatures above 1300° C. on a platinum-containing catalyst (see EP 0,407,809 Bi). Hydrogen is also produced along with the hydrogen cyanide. The BMA method is carried out primarily in a so-called multitube fixed-bed reactor or multitube-flow reactor. The reaction tubes consist essentially of aluminum oxide and are provided on their inner surface with the platinum-containing, catalytically active coating. In order to maintain the reaction temperature the tubes are suspended in the interior of a combustion chamber and the combustion gases flow around them. The reaction tubes are typically approximately 2 m long and have an inside diameter of approximately 16 to 18 mm.

In order to produce the hydrogen cyanide, a mixture of ammonia and methane is conducted through the reaction tubes and heated very rapidly to approximately 1300° C. at normal pressure. In order to avoid the formation of problematic deposits of carbon black on the inner surfaces, the molar ratio of ammonia to methane is maintained in a range of 1.001 to 1.08.

The BMA method achieves yields of hydrogen cyanide of approximately 90% relative to the methane used. The BMA process is endothermic. The energy used for production is approximately 40 MJ per kilogram of hydrogen cyanide produced. The amount of energy per kilogram hydrogen cyanide can be reduced approximately in half by using a monolithic countercurrent reactor as shown in DE 195 24 158.

Both the Andrussow method and the BMA method require high expenses for investment and operation. On account of the high reaction temperatures correspondingly expensive technical designs are required for the reactors. Even the platinum-containing catalysts represent a large investment expense and must be replaced after approximately 10000 to 15000 operating hours on account of increasing deactivation.

The Andrussow method and the BMA method are suitable only for the large-scale production of hydrogen cyanide. A single reactor can have an output of 5000 to 20000 tons per year. The reactors run 1 to 2 years without interruption until the catalyst must be regenerated or replaced. The starting of the reactors is time-consuming and usually takes several hours. No economical method is available for medium production amounts of up to 1000 tons per year.

An object of the present invention therefore is to produce hydrogen cyanide which operates at essentially low temperatures, and without catalysts.

Another object of the present invention is to provide a process for the production of hydrogen cyanide in rather small amounts.

SUMMARY OF THE INVENTION

The above and other objects of the invention can be achieved by a method of producing hydrogen cyanide by the gas-phase reaction of methane with ammonia at an elevated temperature and at an ammonia/methane molar ratio above 1. The method is characterized in that the gaseous reaction mixture is heated to a temperature between 500 and 1000° C. and conducted through a corona discharge. An ammonia/methane molar ratio between 1.001 and 1.1 is preferably selected.

A corona discharge forms in gases with pressures of approximately atmospheric pressure and higher at areas of high electric field strengths. Such a discharge can be generated, for example, between two metallic electrode plates by applying an electric voltage. The high electric field strengths required can be generated with conventional high-voltage sources of 10 to 20 kV output voltage if metallic points, also designated as discharge points in the following, are placed on the electrode plates. The developing field strength in the vicinity of the points is a multiple of the field strength between two plates without metal points and suffices for maintaining the corona discharge. The voltage needed for the corona discharge can be a direct voltage or alternating voltage with frequencies up to 500 kHz.

The gas-phase reaction of methane and ammonia to yield hydrogen cyanide and hydrogen is not possible until at very high temperatures above 1300° C. It was found that as a result of the action of the corona discharge this reaction takes place at very much lower temperatures, that is of a maximum of 1000° C. Temperatures between 500 and 1000° C. are favorable for the reaction according to the present invention.

The supporting action of the corona discharge is dependent on the type of the electric wiring of the electrodes. Three significant circuit types can be distinguished: bipolar, unipolar positive and unipolar negative.

In the bipolar wiring of the electrodes the electrodes are connected to the positive and the negative pole of a direct-voltage source symmetrical with respect to the ground. In the case of the unipolar positive wiring the negative, and in the case of the unipolar negative, the positive pole of the voltage source is grounded. Thus, in the unipolar wiring of the electrodes one of the two electrodes is always grounded.

The three wiring types can logically also be transferred to alternating-voltage sources. In the case of unipolar negative wiring one electrode is likewise grounded whereas the potential of the counterelectrode or opposite electrode assumes negative values in relation to the grounded electrode in the cycle of the alternating voltage. The situation is analogous for unipolar positive wiring and for bipolar wiring.

The best results were achieved with unipolar negative wiring. The corona discharge which develops thereby is designated within the framework of this invention as a negative corona discharge. The spatial area in which the corona discharge takes place is loaded by the two electrodes. When the flow passes through this spatial area the methane molecules and ammonia molecules are excited or ionized by collisions with the electrodes of the discharge. This makes the conversion to hydrogen cyanide possible at considerably lower temperatures than is the case in conventional production methods.

The current densities which can be achieved with a corona discharge are low. They are in a range between $0.1\ \mu A/cm^2$ and $0.1\ mA/cm^2$. They can be influenced only to a limited extent by the electrode configuration and by the applied voltage. If the attempt is made to increase the current flow by raising the applied voltage there is the danger that the corona discharge will turn into a spontaneous or self-sustained arc discharge. On the other hand, too low a discharge current does not suffice for a sufficient excitation of the reaction partners. It proved to be advantageous to coordinate the space velocity of the gaseous reaction mixture in such a manner by the spatial area loaded by the electrodes and by the discharge current that approximately 0.02 to 100 coulombs of electric charge flow through the gaseous reaction mixture per mole methane.

The separation of the formed hydrogen cyanide out of the product gas mixture can be carried out in a known manner.

A particular advantage of the method of the invention is the fact that the formation of the hydrogen cyanide can be terminated immediately by turning off the corona discharge. Likewise, the formation of hydrogen cyanide begins immediately after the electric discharge has been turned on. A start-up time of the process lasting several hours as in the known large-scale methods is not necessary in accordance with the present invention.

BRIEF DESCRIPTION OF DRAWINGS

The present invention will be further understood with reference to the following exemplary embodiments as illustrated in the drawings wherein:

FIG. 2b shows a schematic top view of the design of the electrode according to FIG. 2a;

FIG. 3 is a representation of a point for generating the corona discharge and is an enlarged detailed view of "A" of FIG. 2a;

DETAILED DESCRIPTION OF INVENTION

The present invention will now be described in further detail.

Figure 1:
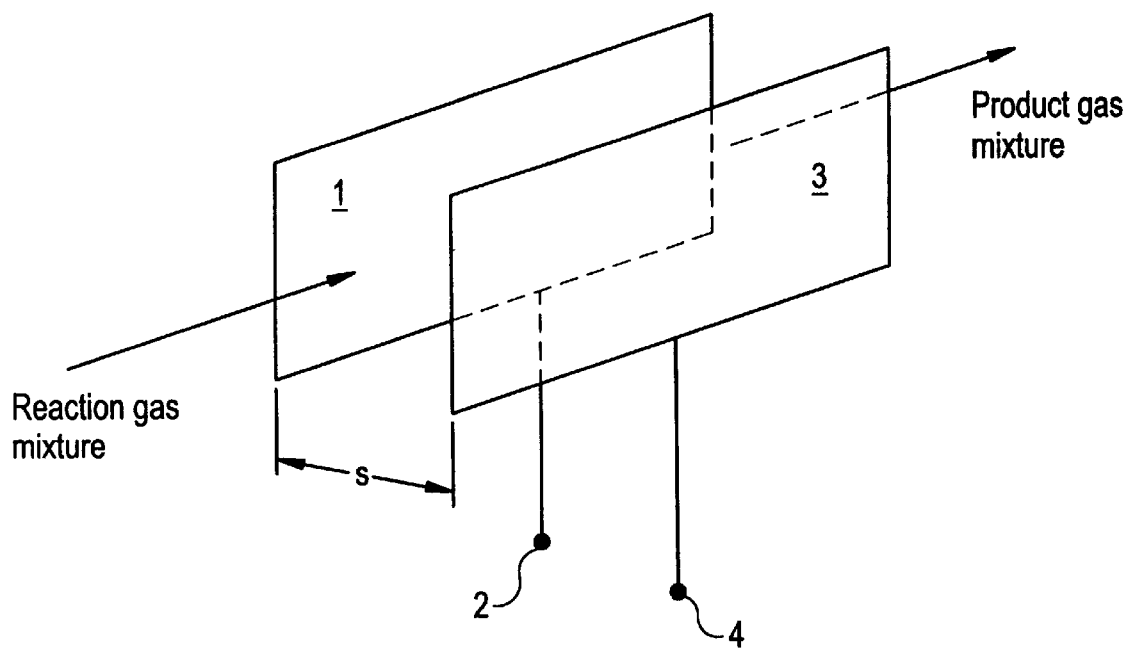
FIG. 1 shows a schematic perspective view of an electrode arrangement for carrying out the method of the present invention.

FIG. 1 shows a perspective view of the electrode arrangement for producing hydrogen cyanide under the effect of an electric corona discharge. The two plate electrodes 1 and 3 are arranged parallel to one another with a mutual spacing s. The electrodes are connected to a voltage source via electric connections 2,4. The two electrodes are preferably built into a tubular reactor with square or rectangular cross section. The gas-supply lines to the tubular reactor are provided with heating devices (not shown) in order to heat the gaseous reaction mixture to the required reaction temperature. The tubular reactor itself (not shown) can also be heated. After having passed through the discharge stretch between the electrodes and having left the reactor, the gaseous product mixture containing the hydrogen cyanide formed is conducted to the customary separating methods (not shown) in order to separate the hydrogen cyanide formed.

Figure 2A:
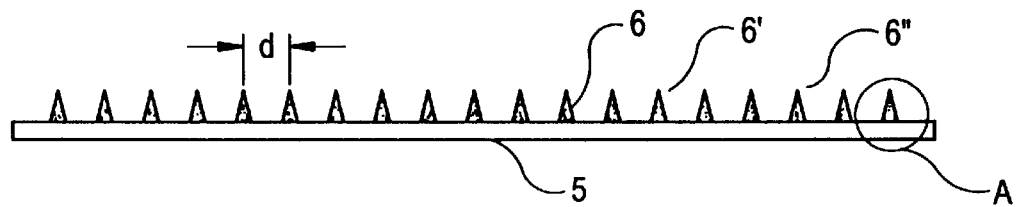
FIG. 2a shows a schematic lateral view of a design of an electrode for producing the corona discharge.
Figure 2B:
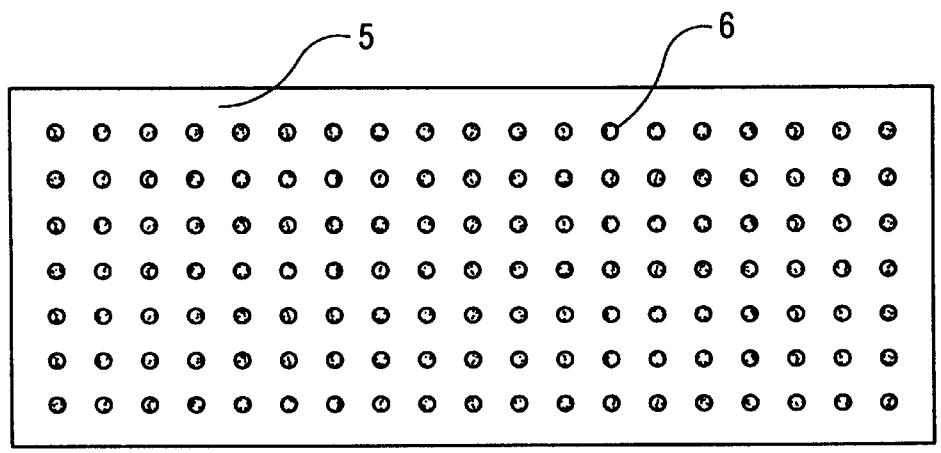
Figure 3:
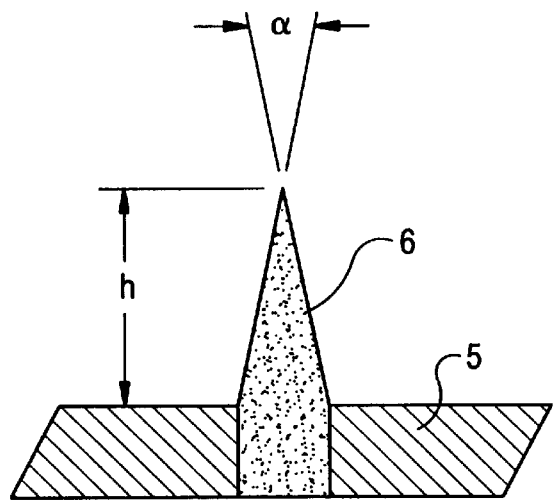

In order to generate the corona discharge between the metallic electrodes the opposite surfaces of the electrodes are provided as shown in FIG. 2a and 2b with metallic discharge points. FIG. 2a shows a lateral view of an electrode plate 5 with a plurality of points 6, 6', 6" ... placed on it. The discharge points are preferably arranged in a regular grid with grid spacing d. FIG. 2b shows a top view of the surface of the electrode provided with the points. FIG. 3 shows an enlarged view of detail A of FIG. 2a. The discharge points are set into the electrode plate and have a height h above the electrode plate. Point angle α of the electrodes can be between 10 and 30°. Stainless steels such as e.g. V4A, have proven to be suitable material for the electrode plate and the points.

FIGS. 2a, 2b and 3 show only one possible embodiment of the electrodes for generating the corona discharge. The method of the invention is in no way limited to only this embodiment. The grid arrangement of the points is to a large extent freely selectable, likewise the specific design of the points. In the case of unipolar wiring, discharge points can be eliminated for the grounded electrode plate. Instead of the metallic electrode plate a dielectric holding plate can also be used for the discharge points.

Figure 4A:
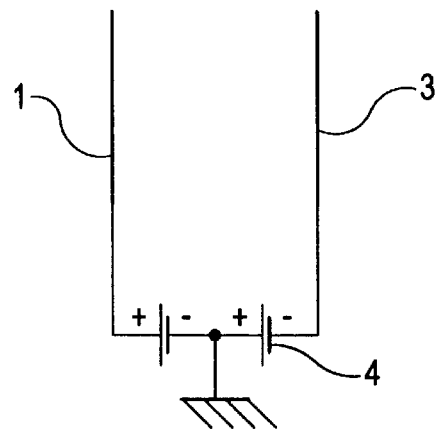
FIG. 4a shows an electric bipolar wiring of the electrodes.
Figure 4B:
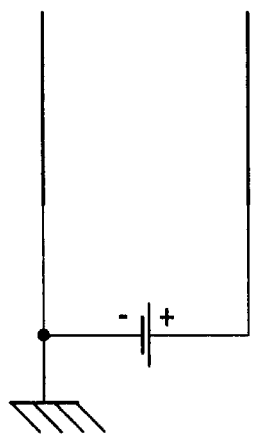
FIG. 4b shows an electric unipolar positive wiring of the electrodes.
Figure 4C:
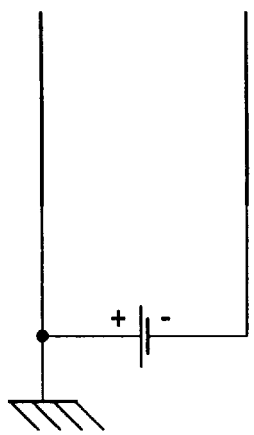
FIG. 4c shows an electric unipolar negative wiring of the electrode.

FIGS. 4a, 4b and 4c show different electric wirings of electrode plates 1 and 3. For the sake of simplicity the discharge points have been left out of this presentation. In FIG. 4a the electrodes are wired in a bipolar manner with a voltage source 4 symmetrical with respect to the ground. FIG. 4b shows a unipolar positive wiring and FIG. 4c unipolar negative wiring. In the two latter circuit types one of the electrodes is grounded. The second electrode is connected to the plus or, respectively, the minus pole of the voltage source. As discussed previously the direct-voltage source can be replaced by an alternating-voltage source.

The following examples were carried out in a quartz-glass reactor with a square cross section with a side length of 5 cm. Two electrodes with a mutual interval of 3.5 cm were set up in this reactor in accordance with FIG. 1. The electrodes had a surface of 4×10 cm$^2$ and were provided with points 5 mm high with a grid interval of 7 mm. The point angle was 15°.

The supply line to the reactor also consisted of quartz glass and had a diameter of 5 cm. The volume flows of methane and ammonia were regulated with float flowthrough meters and mixed with one another in the supply line. The supply line was conducted in front of the reactor through a tubular furnace which preheated the gaseous reaction mixture to the desired reaction temperature.

The product gas mixture was conducted behind the reactor through washing bottles for separation and analysis of the individual components. Non-reacted ammonia was washed out in a first washing bottle with sulfuric acid and the hydrogen cyanide formed separated in a second washing bottle with sodium hydroxide solution. The remaining hydrogen and non-reacted methane were burned.

Sodium cyanide was formed by the washing out of the hydrogen cyanide with sodium hydroxide solution which sodium cyanide was determined by argentometric titration. The amount of non-reacted ammonia was determined by nitrogen determination according to Kjeldahl. Mass fluxes of 550 mmol/h ammonia and 500 mmol/h methane were used in all examples.

EXAMPLE 1

The gaseous reaction mixture was heated to 500° C. prior to entering into the reactor. No voltage was applied to the electrodes.

Neither the formation of sodium cyanide was detected nor was a conversion of ammonia able to be established.

EXAMPLE 2

Example 1 was repeated with a preheating of the gaseous reaction mixture to 1000° C.

A yield of 0.4% hydrogen cyanide relative to methane was found.

EXAMPLE 3

The gaseous reaction mixture was preheated to only 250° C. and conducted through the reactor. The electrodes were wired in a unipolar positive manner. The applied voltage was +2.4 kV. A current flow of 9.2 mA was measured.

A yield of 4.8% hydrogen cyanide relative to methane was found. The conversion of ammonia was approximately 6%.

EXAMPLE 4

Example 3 was repeated with a preheating to 400° C. and a voltage of +8 kV. A current flow of 6.5 mA was measured.

The yield of hydrogen cyanide was 5.9% relative to methane. The conversion of ammonia was 8%.

EXAMPLE 5

The gaseous reaction mixture was preheated to 400° C. The electrodes were wired in a bipolar manner. The applied voltages were +4 kV and −4 kV. A current flow of 6.5 mA was measured.

A hydrogen-cyanide yield of 7.3% relative to methane and an ammonia conversion of 10% were determined.

EXAMPLE 6

The gaseous reaction mixture was preheated to 500° C. The electrodes were wired in a unipolar negative manner. The applied voltage was −11 kV. A current flow of 0.9 mA was measured.

A hydrogen-cyanide yield of 17.3% relative to methane and an ammonia conversion of 20% were determined.

EXAMPLE 7

Example 6 was repeated with a preheating of the gaseous reaction mixture to 600° C. and a voltage of −13 kV. A current flow of 0.7 mA was measured.

The yield of hydrogen cyanide was 36.8% relative to methane at a conversion of ammonia of 41%.

EXAMPLE 8

The electrodes used in the preceding examples were replaced with new ones with a greater density of discharge points. The grid interval of the discharge points was only 1.5 mm.

The gaseous reaction mixture was preheated as in example 6 to 600° C. A current flow of 0.8 mA was measured at a voltage of −12 kV.

The yield of hydrogen cyanide was 56.2% relative to methane at an ammonia conversion of 70%.

EXAMPLE 9

Example 8 was repeated but with the electrode interval reduced from 3.5 cm to 2 cm. A current of 1 mA was measured at a voltage of −7 kV.

The yield of hydrogen cyanide was 65.3% relative to methane at an ammonia conversion of 70%.

The results obtained are collated in table 1. In it, T signifies the temperature of the gaseous reaction mixture upon entering the reactor and U and I the voltage applied to the electrodes and the measured current. A is the yield of hydrogen cyanide relative to methane. U is the measured conversion of ammonia. In addition, table 1 contains data about the electric charge which flowed per mole methane.

Further variations and modifications of the invention will be apparent to those skilled in the art from the foregoing and are intended to be encompassed by the claims appended hereto.

German priority application 197 54 982.9 is relied on and incorporated herein by reference.

TABLE 1

Results of the examples

| Example | T (° C.) | Wiring | U (kV) | I (mA) | A (%) | U (%) | Charge per mole methane (C/mole) |
|---|---|---|---|---|---|---|---|
| 1 | 500 | — | — | — | — | — | — |
| 2 | 1000 | — | — | — | 0.4 | — | — |
| 3 | 250 | unipolar positive | +2.4 | 9.2 | 4.8 | 6 | 66.2 |
| 4 | 400 | unipolar positive | +8 | 6.5 | 5.9 | 8 | 46.8 |
| 5 | 400 | bipolar | +4/−4 | 6.5 | 7.3 | 10 | 46.8 |
| 6 | 500 | unipolar negative | −11 | 0.9 | 17.3 | 20 | 6.5 |
| 7 | 600 | unipolar negative | −13 | 0.7 | 36.8 | 41 | 5 |

TABLE 1-continued

Results of the examples

| Example | T (° C.) | Wiring | U (kV) | I (mA) | A (%) | U (%) | Charge per mole methane (C/mole) |
|---|---|---|---|---|---|---|---|
| 8 | 600 | unipolar negative | −12 | 0.8 | 56.2 | 70 | 5.8 |
| 9 | 600 | unipolar negative | −7 | 1 | 65.3 | 70 | 7.2 |

A: Yield of hydrogen cyanide relative to methane
U: Conversion of ammonia

We claim:

1. A method of producing hydrogen cyanide comprising reacting in a gas-phase, a gaseous reaction mixture of methane with ammonia at a temperature between 500 and 1000° C., with an ammonia/methane ratio greater than 1, and conducting said reaction mixture through a corona discharge to complete the reaction to form hydrogen cyanide.

2. The method according to claim 1, wherein space velocity of said reaction mixture and discharge current of said corona discharge are coordinated with one another in such a manner that 0.02 to 100 coulombs of electric charge per mole methane flow through the gaseous reaction mixture.

3. The method according to claim 2, wherein the discharge is a direct-voltage discharge.

4. The method according to claim 3 wherein the discharge is bipolar, unipolar negative or unipolar positive.

5. The method according to claim 2, wherein the discharge is an alternating-voltage discharge.

6. The method according to claim 5 wherein the discharge is bipolar, unipolar negative or unipolar positive.

* * * * *